Sept. 10, 1935.   E. A. STULLER   2,014,151
EMERGENCY TIRE CHAIN
Filed May 26, 1933
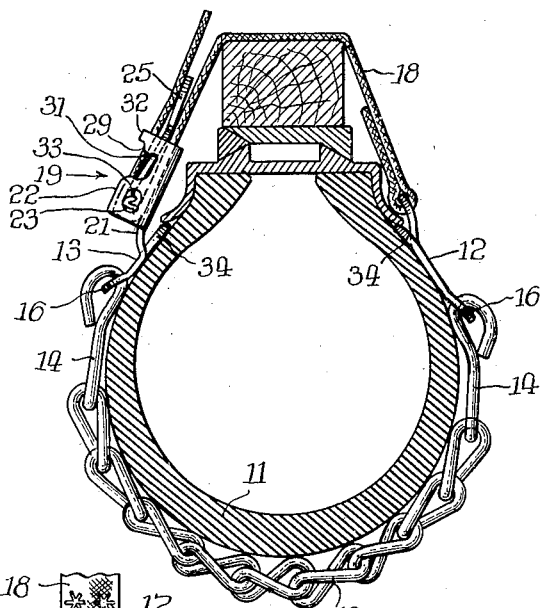
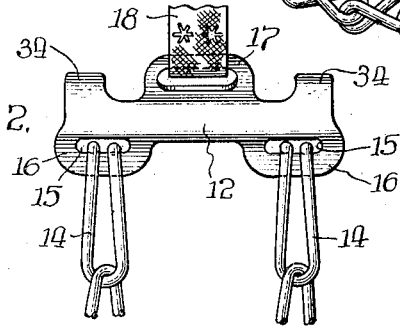
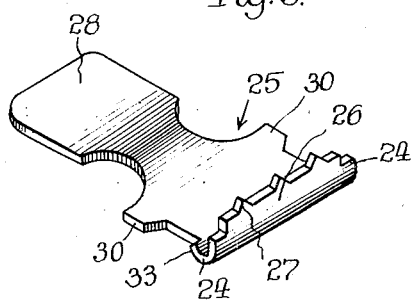
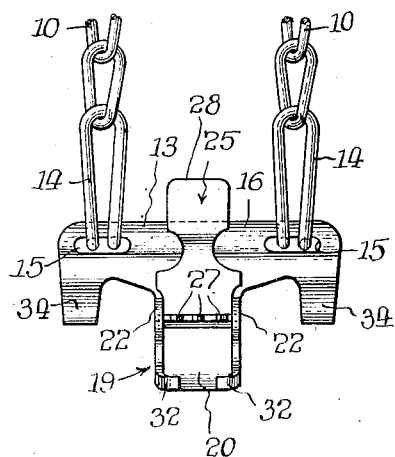
Inventor
Earl A. Stuller,
By Churchill Parker Carlson
Attys.

Patented Sept. 10, 1935

2,014,151

UNITED STATES PATENT OFFICE 2,014,151

EMERGENCY TIRE CHAIN

Earl A. Stuller, Chicago, Ill., assignor to Western Chain Products Co., Chicago, Ill., a corporation of Illinois Application May 26, 1933, Serial No. 672,909

12 Claims. (Cl. 152—14)

The invention relates generally to tire chains of the type known as emergency chains wherein one or more of the chains may be secured about a tire without moving the vehicle or raising the wheel.

A general object of the invention is to provide a novel chain of this character which is sturdy, may be quickly and permanently secured in place, and which in operation will not slip circumferentially of the tire.

Another object is to provide an improved emergency chain which embodies novel means for engaging the rim of the wheel or a comparable part to hold the chain in proper operative position by preventing lengthwise movement or slip thereof circumferentially of the tire.

More specifically stated, another object is to provide in an emergency chain having cross bars to which the ends of the chains are secured, means fashioned integrally with said bars and extending therefrom for engagement with the wheel rim upon lengthwise movement of the chain whereby such movement is permanently arrested.

Other objects and advantages will become apparent from the following description and in the accompanying drawing, in which:

Figure 1 is a transverse section through a tire and rim assembly showing an emergency tire chain secured thereon embodying the features of the invention.

Fig. 2 is a fragmentary plan view of an emergency tire chain in extended condition.

Fig. 3 is a perspective view of the pivotally mounted part of the fastener device.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing wherein one form of the device is shown merely for illustrative purposes, 10 designates a plurality of chains or similar road-engaging members which are dimensioned to fit about the outer part of a vehicle wheel such as the tread portion of a tire 11. The opposite ends of the chains are connected in any conventional manner with cross bars 12 and 13 which support the chains in spaced relation on the tire. Herein the chains are secured to the cross bars by end links 14 permanently affixed to the cross bars through apertures 15 which are located in portions 16 of the cross links. The portions 16, as may be seen in Fig. 1, are offset outwardly from the face plane of the cross bars to provide a clearance for the end links 14 which allows the body of the cross bars to be disposed adjacent to or in contact with the underlying wall of the tire.

One of the cross bars, in this instance the cross bar 12, has on the side thereof opposite the portion 16 a centrally located apertured ear 17 which is also offset outwardly from the face plane of the cross bar. A flexible fastening member, such as a woven strap 18, passes through the ear and is permanently secured upon itself. The other cross bar 13 carries a fastening device, generally indicated at 19, for detachably engaging the end of the flexible member 18 to secure the chain in place.

A preferred form of fastening device comprises the following structure. Centrally of the cross bar 13 and on the side thereof opposite the portion 16 is an integral elongated plate 20 which is outwardly offset from the face plane of the cross bar 13 as indicated at 21 (Fig. 1). Each longitudinal side of the plate 20 is turned outwardly at right angles to the base portion of the plate to form side walls 22 which define therebetween a channel through which an end portion of the flexible strap may pass.

In the ends of the side walls next to the cross bar transversely alined apertures 23 (Fig. 1) are provided to receive pivots 24 on a clamping lever 25 (Fig. 3). The clamping lever 25 is preferably in the form of a bell crank lever having a short arm 26, provided with projections 27 for engagement with the flexible strap 18, and a long arm 28 by which the user manipulates the lever.

To assemble the emergency tire chain about a tire, the user positions the chains across the tread of the tire, as shown in Fig. 1, passes the flexible strap across the inside of the wheel, inserts the end of the strap between the short arm 26 of the bell crank lever and the plate 20, draws the assembly taut, and then presses the lever arm 28 into a position along the flexible strap thereby moving the short arm 26 of the bell crank lever and the projections thereon into binding engagement with the flexible strap. Preferably, the channel defining side walls 22 are intermediately recessed as at 29 to allow ears 30 to be brought into alinement with opposed recesses 31 on the side walls. The apertures 23 are of substantial size so that the bell crank lever may be shifted longitudinally by a force tending to withdraw the flexible strap from the fastening device. This longitudinal shifting movement carries the ears 30 into the recesses 31 to lock the bell crank lever against accidental opening movement. The front end of the flexible strap may be bent upon itself about the clamping lever 25 and passed beneath inturned ears 32 on the side walls to further secure the clamping lever against accidental opening movement.

Preferably the flexible straps 18 are fashioned of woven material and in different lots this material has been found to vary in thickness to a considerable extent. This variation should be taken into consideration in the construction of the fastener or the fastener will cut a strap which is too thick and will not properly hold one which is too thin. In this embodiment, the construction of the bell crank lever 25 is such that compensation for the variation of strap thickness may be easily made. Thus, the bell crank lever is preferably a stamping and the long and short arms are formed by bending the stamping on a transverse line. The pivots 24 are of substantial longitudinal dimension and are located on the transverse line of bending. Hence when the lever is formed, the pivots are also bent to produce curled or arcuate antifriction outer surface. To compensate for strap thickness variations, the transverse line of bending is shifted longitudinally to increase or decrease the length of the short arm 26 as required. This operation of course does not affect the formation of the pivots. However, it is desirable to stamp or otherwise shape the ends of the pivots along the long arm 28 into arcuate form as indicated at 33 (Figs. 1 and 3). The resulting pivot structure has a substantially rounded outer surface regardless of the location of the line of bending.

Since in use chains of the emergency type tend to slip longitudinally of themselves, means is provided for preventing such movement. One preferred form of such means (see Figs. 1 and 2) comprises stop fingers 34 formed integrally with and near each end of the cross bars 12, 13. The fingers are offset or turned inwardly from the plane of the respective cross bars to occupy operative positions substantially adjacent the tire wall. Should the chain slip in operation, the stop fingers on one of the cross bars will move into engagement with the tire rim, as shown in Fig. 1, thereby to prevent further movement thereof. The provision of such fingers at both ends of the cross bars prevents tipping of the bars upon engagement and effectively insures against undesired displacement of the chains relative to the tire.

It will be apparent from the foregoing that an improved emergency chain has been provided which is efficient in operation, is positively maintained in its proper relationship on the tire, is simple in construction, and may be manufactured and sold at a relatively low cost.

I claim as my invention:

1. In an emergency chain device, the combination of a plurality of chains, flat cross bars secured at the ends of said chains, means for securing the chain device operatively about a tire, and means for preventing longitudinal movement of said device including stop fingers integral with each of said cross bars and extending therefrom away from said chains, said fingers being turned inwardly to extend at a slight angle to the plane of said cross bars to follow the contour of the tire wall whereby to position said fingers for engagement with an outstanding part of the wheel assembly.

2. In an emergency tire chain, the combination of a pair of flat cross bars of substantial width, a plurality of road engaging means secured by their ends and at spaced intervals along one side edge of each cross bar, an outwardly turned member located centrally of each cross bar on the side thereof opposite that to which said road engaging means are secured, flexible means extending between said members for operatively securing the device about a tire and wheel assembly, and inwardly turned fingers located near the ends of each cross bar on opposite sides of the centrally located member for engagement with parts of the wheel assembly to prevent shifting movement of the cross bars and longitudinal travel of the device.

3. In an emergency tire chain for vehicle wheels embodying a tire and rim assembly, the combination of a plurality of road engaging members, cross bars at the opposite ends of said members maintaining said members in spaced relation, said cross bars each having means thereon adapted to rest against a tire wall and projecting from said cross bar toward the tire rim when the device is assembled on a vehicle wheel whereby upon slippage of said device longitudinally of itself said means will enter the gap between the tire and rim, and means for connecting said cross bars to assemble the device on the vehicle wheel including parts connected with the cross bars at points located beyond the projecting edges of the rim engaging means.

4. In an emergency chain unit for vehicle wheels having a tire and rim assembly, the combination of traction means for engagement with the road, supporting means for said traction means including a substantially flat member adapted to be positioned along the tire wall immediately adjacent to the rim, rim engageable means extending from said member toward the rim and arranged to abut the underlying tire wall, and means for mounting said unit on a wheel assembly including a connecting part carried by said supporting means in outwardly spaced relation to said tire wall, said connecting part and said supporting means and said rim engageable means being so related that the force which holds the unit on a wheel assembly maintains said rim engageable means for introduction into the gap between the rim and tire as longitudinal slippage of the unit occurs.

5. In an emergency chain unit for vehicle wheels having a tire and rim assembly, the combination of a plurality of chains, cross means for supporting said chains in spaced relation, said means including a plate adapted to rest against the side wall of the tire immediately adjacent to the rim, means rigid with said plate extending from the edge of said plate adjacent to said rim toward said rim and in abutment with said side wall, said last mentioned means being fashioned to enter the gap between said tire and rim to positively limit creeping of the unit longitudinally of itself, and fastening means for detachably connecting said cross means together.

6. An emergency tire chain device comprising, in combination, a pair of cross bars arranged to lie adjacent the side wall of a tire and having road engaging means extending therebetween, means for operatively securing the device about a tire and wheel assembly, parts integral with said cross bars and spaced from the side wall of the tire for engagement by said means, and stop fingers on said cross bars turned inwardly therefrom and adapted for insertion in the joint between the tire and wheel rim so as to prevent longitudinal slippage of the device.

7. A cross bar for an emergency tire chain assembly comprising a substantially flat plate having on one longitudinal edge an outwardly extending integral member constituting a part of a fastening means, and spaced inwardly extending integral fingers on said edge near each end of said plate for engagement with a part of the tire assembly.

8. In an emergency chain device, the combination of road engaging means adapted to fit about the tread portion of a tire, cross members adapted to parallel the side walls of the tire adjacent to the margin of the rim and having means for the connection therewith of said road engaging means, detachable securing means for connecting the device in position upon a tire and wheel assembly, and means forming a permanent part of said cross members and extending therefrom to follow the contour of the adjacent wall of the tire toward the adjacent margin of the rim and adapted for engagement with the gap between the tire and margin to prevent endwise movement of the chain.

9. In an emergency chain device, the combination of road engaging means to fit about the tread portion of a tire, a cross member adapted to parallel the side wall of the tire and including means for the connection therewith of said road engaging means, detachable securing means for affixing the device about a tire and wheel assembly and adjustable to accommodate tires of various diameters, and restraining means on said cross member for preventing longitudinal movement of the device, said restraining means being arranged on said cross member to extend toward an outstanding part of the wheel assembly near the convergence of the tire therewith and being adapted to be drawn toward engagement with said outstanding part by said attaching means.

10. In an emergency device of the character described, the combination of road engaging members adapted to fit transversely across the tread portion of a tire, cross members secured to the opposite ends of said road engaging members to maintain said members in spaced relationship, said road engaging members being dimensioned so that said cross members occupy positions substantially paralleling the side walls of the tire on opposite sides thereof adjacent to the margins of the tire supporting rim, stop means on said cross members and extending therefrom for engagement with the adjacent underlying side wall of the tire and extending in a direction which follows the contour of said side wall toward the space between said side wall and said rim, said stop means being adapted to enter said space and by engagement thereof with the rim prevent slippage of the device longitudinally, and detachable means arranged to extend from one cross member to the other through the wheel assembly and having connections with said cross members at points spaced from and normally out of contact with the side walls of the tire whereby the tension applied to the device to fit it tightly on the tire and wheel assembly will tend to direct said stop means into the space between said side wall and the rim.

11. In an emergency device of the character described, the combination of road engaging members adapted to fit transversely across the tread portion of a tire, cross members secured to the opposite ends of said road engaging members to maintain said members in spaced relationship, said road engaging members being dimensioned so that said cross members occupy positions substantially paralleling the side walls of the tire on opposite sides thereof adjacent to the margins of the tire supporting rim, stop means on said cross members and extending therefrom for engagement with the adjacent underlying side wall of the tire and extending in a direction which follows the contour of said side wall toward the space between said side wall and said rim, said stop means being adapted to enter said space and by engagement thereof with the rim prevent slippage of the device longitudinally, means for securing the device in place including a flexible member connected at one end to one of said cross members and arranged to extend through the wheel assembly into proximity at its other end with the other cross member, and a fastening device connecting the latter end and cross member and adjustable to draw said stop means toward the space between said side wall and the rim, said fastening device being in outwardly offset relation to the stop means on the adjacent cross member so as to pass across the edge of said rim when the stop means is drawn toward said space.

12. In an emergency tire chain unit of the character described, the combination of road engaging means adapted to fit transversely across the tread portion of a tire, cross members in the form of stamped metal plates connected to the opposite ends of said engaging means and in assembly on a tire occupying positions substantially paralleling the side walls of the tire on opposite sides thereof adjacent to the margins of the tire supporting rim, detachable means arranged to extend from one cross member to the other through the wheel assembly for securing the unit in place, and means formed integrally with said cross members to extend therefrom toward the adjacent underlying side walls of the tire in a direction which follows the contour of said side walls toward the outstanding parts of said rim near the convergence of the tire therewith, whereby the tension applied by said detachable means to the unit to fit it snugly on the tire and wheel assembly will tend to direct the integral means toward engagement with said outstanding parts of the rim.

EARL A. STULLER.